United States Patent
Thurber et al.

(10) Patent No.: US 12,459,081 B2
(45) Date of Patent: Nov. 4, 2025

(54) TREATED BACKING AND COATED ABRASIVE ARTICLE INCLUDING THE SAME

(71) Applicant: 3M INNOVATIVE PROPERTIES COMPANY, St. Paul, MN (US)

(72) Inventors: Ernest L. Thurber, Somerset, WI (US); Yu Yang, Eden Prairie, MN (US); Junting Li, Woodbury, MN (US); Liming Song, Woodbury, MN (US); Stephen M. Sanocki, Hudson, WI (US); Yuyang Liu, St. Paul, MN (US); Michelle L. Conklin, Woodbury, MN (US); Morgan A. Priolo, Woodbury, MN (US); Amelia W. Koenig, St. Paul, MN (US); Yaohua Gao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1025 days.

(21) Appl. No.: 17/283,171

(22) PCT Filed: Oct. 1, 2019

(86) PCT No.: PCT/IB2019/058352
§ 371 (c)(1),
(2) Date: Apr. 6, 2021

(87) PCT Pub. No.: WO2020/075006
PCT Pub. Date: Apr. 16, 2020

(65) Prior Publication Data
US 2021/0387310 A1    Dec. 16, 2021

Related U.S. Application Data

(60) Provisional application No. 62/743,308, filed on Oct. 9, 2018.

(51) Int. Cl.
*B24D 3/00* (2006.01)
*B24D 11/02* (2006.01)

(52) U.S. Cl.
CPC .............. *B24D 3/004* (2013.01); *B24D 11/02* (2013.01)

(58) Field of Classification Search
CPC . B24D 3/00; B24D 3/20; B24D 11/02; B24D 3/004
See application file for complete search history.

(56) References Cited

U.S. PATENT DOCUMENTS

| 3,698,983 A | 10/1972 | Bryant |
| 3,787,224 A | 1/1974 | Uffner |

(Continued)

FOREIGN PATENT DOCUMENTS

| EP | 0776733 | 6/1997 |
| WO | WO 2018-005112 | 1/2018 |
| WO | WO 2020-021457 | 1/2020 |

OTHER PUBLICATIONS

Dee, "Using resorcinol and resorcinol-formaldehyde resins to promote bonding of rubber to metal and textile reinforcements", Rubber World, Sep. 2011, pp. 41-50.

(Continued)

*Primary Examiner* — Pegah Parvini (57) ABSTRACT

A coated abrasive article (100) comprises: a backing (110) comprising polyester and having a major surface (115); a tie layer (120) directly bound to at least a portion of the major surface (115); and an abrasive layer (130) directly bound to at least a portion of the tie layer (120), the abrasive layer (130) comprising abrasive particles (160) and at least one binder resin (140). The tie layer (120) comprises an at least partially cured blend of, on a solids basis, from 50 to 99 parts by weight of at least one styrene-butadiene copolymer latex and from 1 to 50 parts by weight of at least one resorcinol- (Continued)

formaldehyde resin. A treated backing (110) comprising polyester having the preceding tie layer (120) directly bound thereto is also disclosed.

14 Claims, 1 Drawing Sheet

(56) References Cited

U.S. PATENT DOCUMENTS

| | | | |
|---|---|---|---|
| 4,035,961 A | 7/1977 | Pemrick | |
| 4,134,869 A | 1/1979 | Kalafus | |
| 4,282,011 A | 8/1981 | Terpay | |
| 4,314,827 A | 2/1982 | Leitheiser | |
| 4,437,865 A | 3/1984 | Parekh | |
| 4,518,397 A | 5/1985 | Leitheiser | |
| 4,588,419 A | 5/1986 | Caul | |
| 4,623,364 A | 11/1986 | Cottringer | |
| 4,652,274 A | 3/1987 | Boettcher | |
| 4,652,275 A | 3/1987 | Bloecher | |
| 4,734,104 A | 3/1988 | Broberg | |
| 4,737,163 A | 4/1988 | Larkey | |
| 4,744,802 A | 5/1988 | Schwabel | |
| 4,751,138 A | 6/1988 | Tumey | |
| 4,770,671 A | 9/1988 | Monroe | |
| 4,799,939 A | 1/1989 | Bloecher | |
| 4,881,951 A | 11/1989 | Wood | |
| 4,903,440 A | 2/1990 | Larson | |
| 4,927,431 A | 5/1990 | Buchanan | |
| 4,985,340 A | 1/1991 | Palazzotto | |
| 5,011,508 A | 4/1991 | Wald | |
| 5,078,753 A | 1/1992 | Broberg | |
| 5,086,086 A | 2/1992 | Brown-Wensley | |
| 5,090,968 A | 2/1992 | Pellow | |
| 5,108,463 A | 4/1992 | Buchanan | |
| 5,137,542 A | 8/1992 | Buchanan | |
| 5,139,978 A | 8/1992 | Wood | |
| 5,152,917 A | 10/1992 | Pieper | |
| 5,201,916 A | 4/1993 | Berg | |
| 5,203,884 A | 4/1993 | Buchanan | |
| 5,213,591 A | 5/1993 | Celikkaya | |
| 5,227,104 A | 7/1993 | Bauer | |
| 5,236,472 A | 8/1993 | Kirk | |
| 5,256,170 A * | 10/1993 | Harmer | B24D 3/342 428/323 |
| 5,304,223 A | 4/1994 | Pieper | |
| 5,304,224 A | 4/1994 | Harmon | |
| 5,328,716 A | 7/1994 | Buchanan | |
| 5,344,688 A | 9/1994 | Peterson | |
| 5,355,636 A | 10/1994 | Harmon | |
| 5,366,523 A | 11/1994 | Rowenhorst | |
| 5,376,428 A | 12/1994 | Palazzotto | |
| 5,378,251 A | 1/1995 | Culler | |
| 5,385,954 A | 1/1995 | Palazzotto | |
| 5,417,726 A | 5/1995 | Stout | |
| 5,429,647 A | 7/1995 | Larmie | |
| 5,435,816 A | 7/1995 | Spurgeon | |
| 5,436,063 A | 7/1995 | Follett | |
| 5,486,219 A | 1/1996 | Ford | |
| 5,490,878 A | 2/1996 | Peterson | |
| 5,492,550 A | 2/1996 | Krishnan | |
| 5,496,386 A | 3/1996 | Broberg | |
| 5,498,269 A | 3/1996 | Larmie | |
| 5,505,747 A | 4/1996 | Chesley | |
| 5,520,711 A | 5/1996 | Helmin | |
| 5,549,962 A | 8/1996 | Holmes | |
| 5,551,963 A | 9/1996 | Larmie | |
| 5,556,437 A | 9/1996 | Lee | |
| 5,560,753 A | 10/1996 | Schnabel | |
| 5,565,011 A | 10/1996 | Follett | |
| 5,573,619 A | 11/1996 | Benedict | |
| 5,573,816 A | 11/1996 | Gaeta | |
| 5,609,706 A | 3/1997 | Benedict | |
| RE35,570 E | 7/1997 | Rowenhorst | |
| 5,672,097 A | 9/1997 | Hoopman | |
| 5,672,186 A | 9/1997 | Chesley | |
| 5,700,302 A * | 12/1997 | Stoetzel | B24D 3/28 51/298 |
| 5,766,277 A | 6/1998 | DeVoe | |
| 5,851,247 A | 12/1998 | Stoetzel | |
| 5,913,716 A | 6/1999 | Mucci | |
| 5,942,015 A | 8/1999 | Culler | |
| 5,946,991 A | 9/1999 | Hoopman | |
| 5,954,844 A | 9/1999 | Law | |
| 5,961,674 A | 10/1999 | Gagliardi | |
| 5,975,987 A | 11/1999 | Hoopman | |
| 5,975,988 A | 11/1999 | Christianson | |
| 5,984,988 A | 11/1999 | Berg | |
| 6,059,850 A | 5/2000 | Lise | |
| 6,114,021 A | 9/2000 | Pankratz | |
| 6,129,540 A | 10/2000 | Hoopman | |
| 6,261,682 B1 | 7/2001 | Law | |
| 6,521,005 B1 | 2/2003 | Vincent | |
| 7,150,770 B2 | 12/2006 | Keipert | |
| 7,150,771 B2 | 12/2006 | Keipert | |
| 7,364,800 B2 | 4/2008 | Jesberger | |
| 8,034,137 B2 | 10/2011 | Erickson | |
| 8,840,920 B2 | 9/2014 | Nugara | |
| 8,940,063 B2 | 1/2015 | Yang | |
| 9,085,838 B2 | 7/2015 | Maldonado | |
| 2003/0232915 A1 * | 12/2003 | Corvasce | D06M 15/41 524/502 |
| 2006/0265967 A1 | 11/2006 | Follensbee | |
| 2009/0165394 A1 | 7/2009 | Culler | |
| 2009/0169816 A1 | 7/2009 | Erickson | |
| 2009/0325466 A1 * | 12/2009 | Kincaid | B24D 3/20 451/28 |
| 2010/0249168 A1 * | 9/2010 | Kronholm | A61P 17/06 546/26 |
| 2015/0267097 A1 | 9/2015 | Rosenflanz | |
| 2017/0165992 A1 * | 6/2017 | Kimura | B41M 5/3377 |

OTHER PUBLICATIONS

Safety Data Sheet: "Rovene® 5900", Mallard Creek Polymers, Jul. 2015, 7 pages.

International Search Report for PCT International Application No. PCT/IB2019/058352, mailed on Dec. 9, 2019, 6 pages.

* cited by examiner

TREATED BACKING AND COATED ABRASIVE ARTICLE INCLUDING THE SAME

TECHNICAL FIELD

The present disclosure broadly relates to treated backings, coated abrasive articles, and methods of making and using the same.

BACKGROUND

In general, coated abrasive articles have abrasive particles secured to a backing. More typically, coated abrasive articles comprise a backing having two major opposed surfaces and an abrasive layer secured to one of the major surfaces. The abrasive layer is typically comprised of abrasive particles and a binder, wherein the binder serves to secure the abrasive particles to the backing.

One common type of coated abrasive article has an abrasive layer which comprises a make layer, a size layer, and abrasive particles. In making such a coated abrasive article, a make layer precursor is applied to a major surface of the backing. Abrasive particles are then at least partially embedded into the make layer precursor (for example, by electrostatic coating), and the make layer precursor is sufficiently cured to form a make layer securing the abrasive particles to the backing. A size layer precursor is then applied over the make layer and abrasive particles, followed by curing of the size layer precursor (optionally with further curing of the make layer) to form the size layer. Often a supersize layer, which may contain antiloading additives and/or grinding aids, for example, is disposed over the size layer.

Another common type of coated abrasive article comprises an abrasive layer secured to a major surface of a backing, wherein the abrasive layer is provided by applying a slurry comprised of binder precursor and abrasive particles onto a major surface of a backing, and then curing the binder precursor.

Backings used in coated abrasive articles are often treated with one or more applied coatings. Examples of typical backing treatments are a backsize layer (that is, a coating on the major surface of the backing opposite the abrasive layer), a presize layer or a tie layer (that is, a coating on the backing disposed between the abrasive layer and the backing), and/or a saturant that saturates the backing. A subsize is similar to a saturant, except that it is applied to a previously treated backing.

However, depending on the particular choice of abrasive layer and backing (treated or untreated), the abrasive layer may partially separate from the backing during abrading resulting in the release of abrasive particles. This phenomenon is known in the abrasive art as "shelling". In most cases, shelling is undesirable because it results in a loss of performance.

In one approach, a tie layer disposed between the backing and the abrasive layer has been used to address the problem of shelling in some coated abrasive articles.

Yet, despite such advances, there remains a continuing need for new materials and methods that can reduce the problem of shelling in coated abrasive articles.

SUMMARY

Some coated abrasives have cationically cured layers/materials in contact with a tie layer disposed on the substrate. In such cases, the tie layers containing basic groups can adversely affect the cure of those layers/materials, especially in regions adjacent to the tie layer, resulting in poor adhesion to the tie layer. Advantageously, the present disclosure provides a solution to this problem by providing a tie layer that is acidic by nature.

In one aspect, the present disclosure provides a coated abrasive article comprising:

a backing comprising polyester and having a major surface;

a tie layer directly bound to at least a portion of the major surface, wherein the tie layer comprises an at least partially cured blend of, on a solids basis, from 50 to 99 parts by weight of at least one styrene-butadiene copolymer latex and from 1 to 50 parts by weight of at least one resorcinol-formaldehyde resin; and an abrasive layer directly bound to at least a portion of the tie layer, the abrasive layer comprising abrasive particles and at least one binder resin.

In another aspect, the present disclosure provides a treated backing comprising: a backing comprising polyester, wherein the backing has a tie layer directly bound thereto, wherein the tie layer comprises an at least partially cured blend of, on a solids basis, from 50 to 99 parts by weight of at least one styrene-butadiene copolymer latex and from 1 to 50 parts by weight of at least one resorcinol-formaldehyde resin.

Features and advantages of the present disclosure will be further understood upon consideration of the detailed description as well as the appended claims.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Coated abrasive articles according to present disclosure comprise a backing having a major surface, a tie layer secured to at least a portion of the major surface, and an abrasive layer secured to at least a portion of the tie layer Suitable backings include those known in the art for making coated abrasive articles. Typically, the backing has two opposed major surfaces. The thickness of the backing generally ranges from 0.02 to 5 millimeters, desirably from 0.05 to 2.5 millimeters, and more desirably from 0.1 to 0.4 millimeter, although thicknesses outside of these ranges may also be useful.

Exemplary flexible backings include polyester film (including corona-treated polyester films) and polyester fabric (e.g., which may be woven, knit, or nonwoven). The backing may also be a laminate of two materials (e.g., paper/polyester film, polyester cloth/paper, film/polyester cloth). Any polyester may be used. Exemplary polyesters include polycaprolactone, polylactic acid (PLA), polyethylene terephthalate (PET), polyethylene naphthalate (PEN), polybutylene terephthalate, polybutylene naphthalate, and combinations thereof.

The backing may be a fibrous reinforced thermoplastic (comprising a polyester) such as described, for example, in U.S. Pat. No. 5,417,726 (Stout et al.), or an endless spliceless belt, for example, as described, for example, in U.S. Pat. No. 5,573,619 (Benedict et al.). Likewise, the backing may be a polymeric substrate having hooking stems projecting therefrom such as that described, for example, in U.S. Pat. No. 5,505,747 (Chesley et al.). Similarly, the backing may be a loop fabric such as that described, for example, in U.S. Pat. No. 5,565,011 (Follett et al.).

The backing may be a treated backing having one or more treatments applied thereto such as, for example, a presize, a backsize, a subsize, and/or a saturant. Additional details regarding backing treatments can be found in, for example, U.S. Pat. No. 5,108,463 (Buchanan et al.); U.S. Pat. No. 5,137,542 (Buchanan et al.); U.S. Pat. No. 5,328,716 (Buchanan); and U.S. Pat. No. 5,560,753 (Buchanan et al.).

The tie layer can be prepared from a blend of, on a solids basis, from 50 to 99 parts by weight of at least one styrene-butadiene copolymer latex and from 1 to 50 parts by weight of at least one resorcinol-formaldehyde resin. In some preferred embodiments, the blend comprises on a solids basis, from 60 to 99 parts by weight of at least one styrene-butadiene copolymer latex and from 1 to 40 parts by weight of at least one resorcinol-formaldehyde resin. In some preferred embodiments, the blend comprises on a solids basis, from 70 to 95 parts by weight of at least one styrene-butadiene copolymer latex and from 5 to 30 parts by weight of at least one resorcinol-formaldehyde resin. In some preferred embodiments, the blend comprises on a solids basis, from 80 to 95 parts by weight of at least one styrene-butadiene copolymer latex and from 5 to 20 parts by weight of at least one resorcinol-formaldehyde resin. In some preferred embodiments, the blend comprises on a solids basis, from 85 to 95 parts by weight of at least one styrene-butadiene copolymer latex and from 5 to 15 parts by weight of at least one resorcinol-formaldehyde resin.

The blend of resorcinol-formaldehyde resin and styrene-butadiene copolymer latex can be prepared by simple mixing with stirring of the resorcinol-formaldehyde resin and styrene-butadiene copolymer latex, for example. The coating weight of the blend is not critical, but is preferably enough to provide complete coverage of the desired coating area. The blend of resorcinol-formaldehyde resin and styrene-butadiene copolymer latex typically contains water (e.g., 30-70 percent), and may contain organic solvent (e.g., a coalescing solvent) in addition.

Useful, styrene-butadiene copolymer latexes may be carboxylated or not carboxylated. Exemplary carboxylated styrene-butadiene copolymer latexes include those available for Mallard Creek Polymers, Charlotte, North Carolina, under the ROVENE trade designation such as, for example: ROVENE 4002, ROVENE 4009, ROVENE 4019, ROVENE 4100, ROVENE 4106, ROVENE 4150, ROVENE 4305, ROVENE 4457, ROVENE 4475, ROVENE 4487, ROVENE 5048, ROVENE 5550, ROVENE 5900, ROVENE 6002, ROVENE 6020, ROVENE 6105, and ROVENE 9410. Of these, ROVENE 5900 carboxylated styrene-butadiene copolymer latex is preferred.

Resorcinol-formaldehyde resins can be described by the chemical structure:

wherein m is a positive integer greater than or equal to one, or in the case of mixtures m may be a positive number greater than one. Exemplary resorcinol-formaldehyde resins include those available from Sumitomo Chemical Advanced Technologies, Phoenix, Arizona, under the trade designation PENACOLITE such as, for example, PENACOLITE R 20, PENACOLITE R 50, PENACOLITE R 2120, PENACOLITE R 2170, and PENACOLITE R 2200. One preferred resorcinol-formaldehyde resin is available as PENACOLITE R 50.

The application of the blend of resorcinol-formaldehyde resin and styrene-butadiene copolymer latex to the backing can be performed in a variety of ways including, for example, such techniques as brushing, spraying, roll coating, curtain coating, gravure coating, and knife coating. Organic solvent and/or water may be added to the blend to facilitate the specific coating technique used. The coated backing may then be processed by heating for a time at a temperature sufficient to dry (if organic solvent is present) and at least partially polymerize the coating thereby securing it to the backing. After an optional period of at least 10, 20, or 30 seconds, or even longer, the blend is typically at least partially polymerized.

In some embodiments, the tie layer further comprises at least one of an anionic surfactant or nonionic surfactant. The amount of surfactant in the tie layer can be widely varied. In typical cases, the surfactant constitutes from 0.01 to 10 weight percent of the tie layer, although this is not a requirement. Often the surfactant constitutes from 0.05 to 2 weight percent of the tie layer, and in many cases, 0.1 to 1 weight percent of the tie layer.

Useful anionic surfactants may include, for example, alkylcarboxylates, sulfonates (e.g., petroleum sulfonates, alkylbenzenesulfonates, naphthalenesulfonates, olefin sulfonates), sulfates (e.g., alkyl sulfates, alkarylsulfates, sulfated natural oils & fats, sulfated esters, sulfated alkanolamides, and alkylphenols (ethoxylated & sulfated)).

Useful sulfonate anionic surfactants include alkylsulfonates and alkyl aryl (i.e., alkaryl)sulfonates such as, for example, water-soluble salts or acids of the formula $R^1SO_3M$ wherein M is as defined hereinabove and $R^1$ is a linear or branched alkyl or alkenyl group having from 8 to 30 carbon atoms (e.g., an alkyl or alkenyl group having from 12 to 18 carbon atoms), an alkyl or dialkyl-substituted aryl group having at least 8 carbon atoms in one alkyl moiety and at least 6 carbon atoms in the aryl moiety. Useful sulfonate anionic surfactants also include, for example, mono- and di-alkyl sulfosuccinates having alkyl groups with from at least 8 carbon atoms up to 30 carbon atoms (e.g., 1,4-bis (2-ethylhexyl)sulfo-succinate), glycerol ether sulfonates, a-methyl ester sulfonates, sulfo fatty acids, fatty alcohol ether sulfates, glycerol ether sulfates, hydroxy-mixed ether sulfates, monoglyceride(ether)sulfates, fatty acid amide (ether)sulfates, mono- and dialkyl sulfosuccinates, mono- and dialkyl sulfosuccinamates, sulfotriglycerides, alkyl oligoglucoside sulfates, and combinations of any of the foregoing.

Exemplary fluorinated surfactants include perfluoropolyether surfactants such as, for example, $CF_3OCF_2CF_2CF_2OCHFCF_2COO^-NH_4^+$ from 3M Company or $CF_3CF_2CF_2OCF(CF_3)COO^-NH_4^+$ from E. I. du Pont de Nemours and Co. (DuPont), Wilmington, Delaware. Surfactants based on perfluorobutanesulfonic acid are also suitable, such as FC-4430, FC-4432, and FC-4434 available from 3M Company. Additional examples of fluorinated surfactants include $F(CF_2CF_2)_{1-9}CH_2CH_2SO_3Q$ where Q is a mixture of $H^+$ and ammonium. These are known as ZONYL surfactants, and are available from DuPont. Anionic, cationic, amphoteric, and nonionic fluorinated surfactants are available from AGC Seimi Chemical Co., Ltd. as SURFLON S-211, SURFLON S-221, SURFLON S-241, and SURFLON S-241, respectively.

Exemplary preferred anionic surfactants include sodium dodecylbenzenesulfonate, sodium lauryl sulfate, ammonium lauryl sulfate, dioctyl sodium sulfosuccinate, sodium lauryl sulfate, ammonium lauryl sulfate, sodium laurylbenzenesulfonate, sodium lauryl ether sulfate (SLES), sodium laureth sulfate, sodium lauryl ether sulfate (SLES), sodium myreth sulfate, and sodium stearate.

Examples of nonionic surfactants include alcohol ethoxylates such as laurylethoxylate (3 EO), laurylethoxylate (7 EO), laurylethoxylate (23 EO), cetylethoxylate (10 EO), cetylethoxylate (20 EO), stearylethoxylate (10 EO), stearylethoxylate (20 EO), oleylethoxylate (20 EO), and tallowethoxylate (30 EO); alkylphenol ethoxylates such as octylphenylethoxylate (5 EO), octylphenylethoxylate (10 EO), octylphenylethoxylate (30 EO), nonylphenylethoxylate (8 EO), nonylphenylethoxylate (10 EO), nonylphenylethoxylate (15 EO), nonylphenylethoxylate (20 EO), nonylphenylethoxylate (30 EO), and dodecylphenylethoxylate (10 EO); poly(oxyethylene-co-oxypropylene)s such as those in which poly(propylene oxide) is ethoxylated and those in which poly(ethylene oxide) is propoxylated; poly(ethylene glycol) esters of fatty acids; poly(oxyethylene) esters of rosin, tall oil, or fatty acid; and sorbitan esters of tall oil or fatty acid.

In one exemplary embodiment, the abrasive layer comprises a make layer comprising a first binder resin, abrasive particles embedded in the make layer, and a size layer comprising a second binder resin secured to the make layer and abrasive particles.

Figure 1:
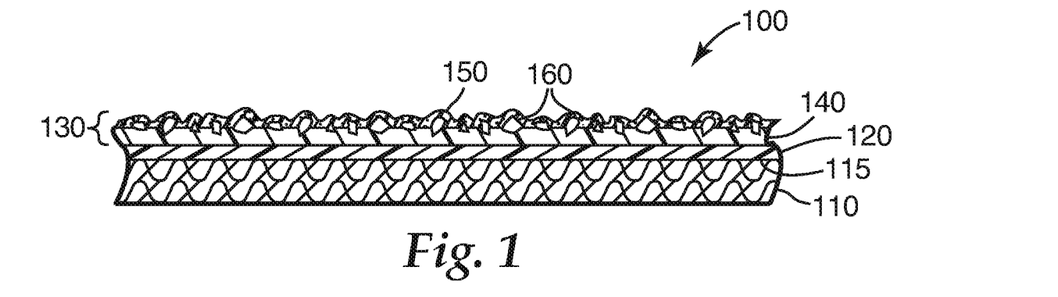
FIG. 1 is a cross-sectional view of an exemplary coated abrasive article.

Referring to FIG. 1, exemplary coated abrasive article 100 according to the present disclosure has backing 110, tie layer 120 directly secured to major surface 115 of backing 110 and abrasive layer 130 directly secured to tie layer 120. Abrasive layer 130, in turn, includes abrasive particles 160 directly secured to tie layer 120 by make layer 140 and size layer 150.

The make and size layers may comprise any binder resin that is suitable for use in abrading applications. Typically, the make layer is prepared by coating at least a portion of the backing (treated or untreated) with a make layer precursor. Abrasive particles are then at least partially embedded (for example, by electrostatic coating) in the make layer precursor comprising a first binder precursor, and the make layer precursor is at least partially polymerized. Next, the size layer is prepared by coating at least a portion of the make layer and abrasive particles with a size layer precursor comprising a second binder precursor (which may be the same as, or different from, the first binder precursor), and at least partially curing the size layer precursor. In one embodiment, the make layer precursor may be partially polymerized prior to coating with abrasive particles and further polymerized at a later point in the manufacturing process.

In one embodiment, a supersize may be applied to at least a portion of the size layer. Useful first and second binder precursors are well known in the abrasive art and include, for example, free-radically polymerizable monomer and/or oligomer, epoxy resins, phenolic resins, styrene-butadiene latexes, melamine-formaldehyde resins, aminoplast resins, cyanate resins, or combinations thereof. In some embodiments, the make layer comprises a cationically cured epoxy resin. In some of those embodiments, the cationic curing is effected by irradiation of a photocatalyst with actinic radiation as described, for example, in U.S. Pat. No. 5,766,277 (DeVoe et al.).

Phenolic resins have good thermal properties, availability, and relatively low cost and ease of handling. There are two types of phenolic resins, resole and novolac. Resole phenolic resins have a molar ratio of formaldehyde to phenol of greater than or equal to one to one, typically in a range of from 1.5:1.0 to 3.0:1.0. Novolac resins have a molar ratio of formaldehyde to phenol of less than one to one. Examples of commercially available phenolic resins include those known by the trade designations DUREZ and VARCUM from Occidental Chemicals Corp., Dallas, Texas; RESINOX from Monsanto Co., Saint Louis, Missouri; and AEROFENE and AROTAP from Ashland Specialty Chemical Co., Dublin, Ohio.

(Meth)acrylated urethanes include di(meth)acrylate esters of hydroxyl-terminated NCO extended polyesters or polyethers. Examples of commercially available acrylated urethanes include those available as CMD 6600, CMD 8400, and CMD 8805 from Cytec Industries, West Paterson, New Jersey.

(Meth)acrylated epoxies include di(meth)acrylate esters of epoxy resins such as the diacrylate esters of bisphenol A epoxy resin. Examples of commercially available acrylated epoxies include those available as CMD 3500, CMD 3600, and CMD 3700 from Cytec Industries.

Ethylenically-unsaturated free-radically polymerizable compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically-unsaturated free-radically polymerizable compounds typically have a molecular weight of less than about 4,000 g/mole and are typically esters made from the reaction of compounds containing a single aliphatic hydroxyl group or multiple aliphatic hydroxyl groups and unsaturated carboxylic acids, such as acrylic acid, methacrylic acid, itaconic acid, crotonic acid, isocrotonic acid, maleic acid, and the like. Representative examples of ethylenically-unsaturated free-radically polymerizable compounds include methyl methacrylate, ethyl methacrylate, styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyl-oxyethyl) isocyanurate, 1,3,5-tris(2-methyacryloxyethyl)-s-triazine, acrylamide, N-methylacrylamide, N,N-dimethylacrylamide, N-vinylpyrrolidone, and N-vinylpiperidone.

Useful aminoplast resins have at least one pendant alpha, beta-unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylene-bisacrylamide, ortho- and para-acrylamidomethylated phenol, acrylamidomethylated phenolic novolac, and combinations thereof. These materials are further described in U.S. Pat. Nos. 4,903,440 and 5,236,472 (both to Kirk et al.).

Isocyanurate derivatives having at least one pendant acrylate group and isocyanate derivatives having at least one pendant acrylate group are further described in U.S. Pat. No. 4,652,274 (Boettcher et al.). An example of one isocyanurate material is the triacrylate of tris(hydroxyethyl) isocyanurate.

Epoxy resins have one or more epoxy groups that may be polymerized by ring opening of the epoxy group(s). Such epoxy resins include monomeric epoxy resins and oligomeric epoxy resins. Examples of useful epoxy resins include 2,2-bis[4-(2,3-epoxypropoxy)-phenyl propane] (diglycidyl ether of bisphenol) and materials available as EPON 828, EPON 1004, and EPON 1001F from Momentive Specialty Chemicals, Columbus, Ohio; and DER-331, DER-332, and DER-334 from Dow Chemical Co., Midland, Michigan. Other suitable epoxy resins include glycidyl ethers of phenol formaldehyde novolac commercially available as DEN-431 and DEN-428 from Dow Chemical Co.

Epoxy resins can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other curing agents (e.g., amine hardeners and guanidines) for epoxy resins and phenolic resins may also be used.

Other cationic curing agents include a salt having an organometallic complex cation and a halogen containing complex anion of a metal or metalloid which are further described in U.S. Pat. No. 4,751,138 (Tumey et al.). Another example is an organometallic salt and an onium salt is described in U.S. Pat. No. 4,985,340 (Palazzotto et al.); U.S. Pat. No. 5,086,086 (Brown-Wensley et al.); and U.S. Pat. No. 5,376,428 (Palazzotto et al.). Still other cationic curing agents include an ionic salt of an organometallic complex in which the metal is selected from the elements of Periodic Group IVB, VB, VIB, VIIB and VIIIB which is described in U.S. Pat. No. 5,385,954 (Palazzotto et al.).

Examples of free radical thermal initiators include peroxides, e.g., benzoyl peroxide and azo compounds.

Compounds that generate a free radical source if exposed to actinic electromagnetic radiation are generally termed photoinitiators. Examples of photoinitiators include benzoin and its derivatives such as α-methylbenzoin; α-phenylbenzoin; α-allylbenzoin; α-benzylbenzoin; benzoin ethers such as benzil dimethyl ketal (e.g., as commercially available as IRGACURE 651 from Ciba Specialty Chemicals, Tarrytown, New York), benzoin methyl ether, benzoin ethyl ether, benzoin n-butyl ether; acetophenone and its derivatives such as 2-hydroxy-2-methyl-1-phenyl-1-propanone (e.g., as DAROCUR 1173 from Ciba Specialty Chemicals) and 1-hydroxycyclohexyl phenyl ketone (e.g., as IRGACURE 184 from Ciba Specialty Chemicals); 2-methyl-1-[4-(methylthio)phenyl]-2-(4-morpholinyl)-1-propanone (e.g., as IRGACURE 907 from Ciba Specialty Chemicals; 2-benzyl-2-(dimethylamino)-1-[4-(4-morpholinyl)phenyl]-1-butanone (e.g., as IRGACURE 369 from Ciba Specialty Chemicals). Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis($\eta_5$-2,4-cyclopentadien-1-yl)-bis[2,6-difluoro-3-(1H-pyrrol-1-yl)phenyl]titanium (e.g., as CGI 784DC from Ciba Specialty Chemicals); halonitrobenzenes (e.g., 4-bromomethylnitrobenzene), mono- and bis-acylphosphines (e.g., as IRGACURE 1700, IRGACURE 1800, IRGACURE 1850, and DAROCUR 4265 all from Ciba Specialty Chemicals). Combinations of photoinitiators may be used. One or more spectral sensitizers (e.g., dyes) may be used in conjunction with the photoinitiator(s), for example, in order to increase sensitivity of the photoinitiator to a specific source of actinic radiation.

Exemplary useful abrasive materials are well-known in the abrasive art and include fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minnesota, black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, flint, and plastic abrasive particles formed from a thermoplastic material (for example, polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (for example, phenolic resins, aminoplast resins, urethane resins, epoxy resins, melamine-formaldehyde, acrylate resins, acrylated isocyanurate resins, urea-formaldehyde resins, isocyanurate resins, acrylated urethane resins, acrylated epoxy resins), and combinations thereof.

Some preferred abrasive materials comprise α-alumina derived from a sol-gel or slurry process. Examples of sol-gel-derived abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.); U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 (Culler et al.) and 2009/0169816 A1 (Erickson et al.). U.S. Pat. Appln. Publ. No. 2015/0267097 (Rosenflanz et al.) describes slurry-derived abrasive particles.

Shaped abrasive particles, including precisely-shaped abrasive particles may be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. Exemplary shapes of shaped abrasive platelets include truncated pyramids (e.g., 3-, 4-, 5-, or 6-sided truncated pyramids) and prisms (e.g., 3-, 4-, 5-, or 6-sided prisms). In some preferred embodiments, the non-magnetizable shaped abrasive platelets comprise triangular prisms, truncated triangular pyramids, or a combination thereof.

Abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 120, ANSI 150, ANSI 180, and ANSI 220. FEPA grade designations include, for example, F120, F150, F180, F220. JIS grade designations include, for example, JIS120, JIS150, JIS180, and J15220.

Alternatively, abrasive particles can be graded to a nominal screened grade using U.S. A. Standard Test Sieves conforming to ASTM E 11 (1995) "Standard Specification for Wire Cloth and Sieves for Testing Purposes". ASTM E-11 (1995) prescribes the requirements for the design and construction of testing sieves using a medium of woven wire cloth mounted in a frame for the classification of materials according to a designated particle size. A typical designation may be represented as −100+120 meaning that the shaped abrasive particles pass through a test sieve meeting ASTM E-11 specifications for the number 100 sieve and are retained on a test sieve meeting ASTM E-11 specifications for the number 120 sieve. Exemplary such grades may include −100+120, −120+150, −150+180, −180+220, although other combinations may be used.

Shaped abrasive particles may have an average side length of 150 to 350 microns (preferably 180 to 330 microns, more preferably 260 to 330 microns) and an average thickness of 40 to 120 microns (preferably 40 to 100 microns, more preferably 60 to 100 microns). The foregoing ranges may be taken in any subcombination or respectively, for example.

Any amount of abrasive particles may be used, and will typically depend at least on part on the intended end use of the coated abrasive article.

Figure 2:
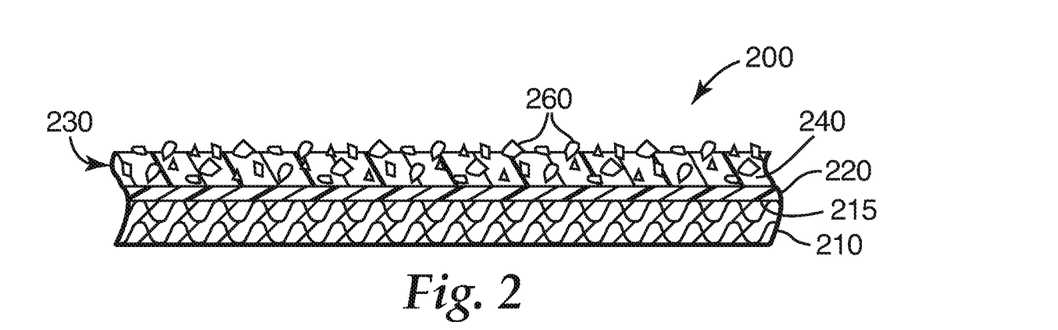
FIG. 2 is a cross-sectional view of another exemplary coated abrasive article.

In another exemplary embodiment of a coated abrasive article according to the present disclosure, the abrasive layer may comprise abrasive particles dispersed in a binder. Referring now to FIG. 2, exemplary coated abrasive article 200 has backing 210, tie layer 220 according to the present disclosure secured to major surface 215 of backing 210, and abrasive layer 230 secured to tie layer 220. Abrasive layer 230 includes abrasive particles 260 dispersed in binder 240.

In making such a coated abrasive article, a slurry comprising a binder precursor and abrasive particles is typically applied to a major surface of the backing, and the binder precursor is then at least partially cured. Suitable binder precursors and abrasive particles include, for example, those listed hereinabove.

Figure 3:
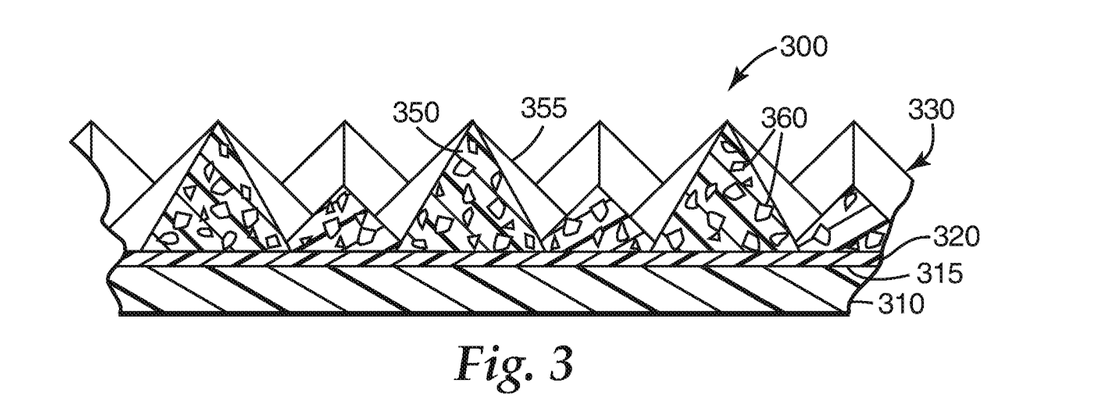
FIG. 3 is a cross-sectional view of another exemplary coated abrasive article.

In another exemplary embodiment, a coated abrasive article according to the present disclosure may comprise a structured abrasive article. Referring now to FIG. 3, exemplary structured abrasive article 300 has backing 310, tie layer 320 according to the present disclosure secured to major surface 315 of backing 310, and abrasive layer 330 secured to tie layer 320. Abrasive layer 330 includes a plurality of precisely-shaped abrasive composites 355. The abrasive composites comprise abrasive particles 360 dispersed in binder 350.

In making such a coated abrasive article, a slurry comprising a binder precursor and abrasive particles may be applied to a tool having a plurality of precisely-shaped cavities therein. The slurry is then at least partially polymerized while in contact with the tie layer on the backing. Suitable binder precursors and abrasive particles include, for example, those listed hereinabove.

The abrasive composites may have a variety of shapes including, for example, those shapes selected from the group consisting of cubic, block-like, cylindrical, prismatic, pyramidal, truncated pyramidal, conical, truncated conical, cross-shaped, and hemispherical.

Optionally, coated abrasive articles may further comprise, for example, a backsize, a presize and/or subsize (that is, a coating between the tie layer and the major surface to which the tie layer is secured), and/or a saturant which coats both major surfaces of the backing. Coated abrasive articles may further comprise a supersize covering at least a portion of the abrasive coat. If present, the supersize typically includes grinding aids and/or anti-loading materials.

Coated abrasive articles according to the present disclosure may be converted, for example, into belts, rolls, discs (including perforated discs), and/or sheets. For belt applications, two free ends of the abrasive sheet may be joined together using known methods to form a spliced belt.

Further description of techniques and materials for making coated abrasive articles may be found in, for example, U.S. Pat. No. 4,314,827 (Leitheiser et al.); U.S. Pat. No. 4,518,397 (Leitheiser et al.); U.S. Pat. No. 4,588,419 (Caul et al.); U.S. Pat. No. 4,623,364 (Cottringer et al.); U.S. Pat. No. 4,652,275 (Bloecher et al.); U.S. Pat. No. 4,734,104 (Broberg); U.S. Pat. No. 4,737,163 (Larkey); U.S. Pat. No. 4,744,802 (Schwabel); U.S. Pat. No. 4,751,138 (Tumey et al.); U.S. Pat. No. 4,770,671 (Monroe et al.); U.S. Pat. No. 4,799,939 (Bloecher et al.); U.S. Pat. No. 4,881,951 (Wood et al.); U.S. Pat. No. 4,927,431 (Buchanan et al.); U.S. Pat. No. 5,498,269 (Larmie); U.S. Pat. No. 5,011,508 (Wald et al.); U.S. Pat. No. 5,078,753 (Broberg et al.); U.S. Pat. No. 5,090,968 (Pellow); U.S. Pat. No. 5,108,463 (Buchanan et al.); U.S. Pat. No. 5,137,542 (Buchanan et al.); U.S. Pat. No. 5,139,978 (Wood); U.S. Pat. No. 5,152,917 (Pieper et al.); U.S. Pat. No. 5,201,916 (Berg et al.); U.S. Pat. No. 5,203,884 (Buchanan et al.); U.S. Pat. No. 5,227,104 (Bauer); U.S. Pat. No. 5,304,223 (Pieper et al.); U.S. Pat. No. 5,328,716 (Buchanan); U.S. Pat. No. 5,366,523 (Rowenhorst et al.); U.S. Pat. No. 5,378,251 (Culler et al.); U.S. Pat. No. 5,417,726 (Stout et al.); U.S. Pat. No. 5,429,647 (Larmie); U.S. Pat. No. 5,436,063 (Follett et al.); U.S. Pat. No. 5,490,878 (Peterson et al.); U.S. Pat. No. 5,492,550 (Krishnan et al.); U.S. Pat. No. 5,496,386 (Broberg et al.); U.S. Pat. No. 5,520,711 (Helmin); U.S. Pat. No. 5,549,962 (Holmes et al.); U.S. Pat. No. 5,551,963 (Larmie); U.S. Pat. No. 5,556,437 (Lee et al.); U.S. Pat. No. 5,560,753 (Buchanan et al.); U.S. Pat. No. 5,573,619 (Benedict et al.); U.S. Pat. No. 5,609,706 (Benedict et al.); U.S. Pat. No. 5,672,186 (Chesley et al.); U.S. Pat. No. 5,700,302 (Stoetzel et al.); U.S. Pat. No. 5,851,247 (Stoetzel et al.); U.S. Pat. No. 5,913,716 (Mucci et al.); U.S. Pat. No. 5,942,015 (Culler et al.); U.S. Pat. No. 5,954,844 (Law et al.); U.S. Pat. No.

5,961,674 (Gagliardi et al.); U.S. Pat. No. 5,975,988 (Christianson); U.S. Pat. No. 6,059,850 (Lise et al.); and U.S. Pat. No. 6,261,682 (Law).

Abrasive articles according to the present disclosure are useful for abrading a workpiece in a process wherein at least a portion of the abrasive layer of a coated abrasive article is frictionally contacted with the abrasive layer with at least a portion of a surface of the workpiece, and then at least one of the coated abrasive article or the workpiece is moved relative to the other to abrade at least a portion of the surface. The abrading process may be carried out, for example, by hand or by machine. Optionally, liquid (for example, water, oil) and/or surfactant (for example, soap, nonionic surfactant) may be applied to the workpiece, for example, to facilitate the abrading process.

SELECT EMBODIMENTS OF THE PRESENT DISCLOSURE

In one embodiment, the present disclosure provides a coated abrasive article comprising:
a backing comprising polyester and having a major surface;
a tie layer directly bound to at least a portion of the major surface, wherein the tie layer comprises an at least partially cured blend of, on a solids basis, from 50 to 99 parts by weight of at least one styrene-butadiene copolymer latex and from 1 to 50 parts by weight of at least one resorcinol-formaldehyde resin; and
an abrasive layer directly bound to at least a portion of the tie layer, the abrasive layer comprising abrasive particles and at least one binder resin.

In a second embodiment, the present disclosure provides a coated abrasive article according to the first embodiment, wherein the tie layer comprises an at least partially cured blend of, on a solids basis, from 85 to 95 parts by weight of the at least one styrene-butadiene copolymer latex and from 5 to 15 parts by weight of the at least one resorcinol-formaldehyde resin.

In a third embodiment, the present disclosure provides a coated abrasive article according to the first or second embodiment, wherein the styrene-butadiene copolymer comprises a carboxylated styrene-butadiene copolymer.

In a fourth embodiment, the present disclosure provides a coated abrasive article according to any one of the first to third embodiments, wherein the at least one styrene-butadiene copolymer has a glass transition temperature of less than 10° C.

In a fifth embodiment, the present disclosure provides a coated abrasive article according to any one of the first to fourth embodiments, wherein the tie layer further comprises at least one of an anionic or nonionic surfactant.

In a sixth embodiment, the present disclosure provides a coated abrasive article according to any one of the first to fifth embodiments, wherein the backing comprises a polyester fabric.

In a seventh embodiment, the present disclosure provides a coated abrasive article according to any one of the first to fifth embodiments, wherein the backing comprises a polyester film.

In an eighth embodiment, the present disclosure provides a coated abrasive article according to any one of the first to seventh embodiments, wherein the backing comprises a treated backing comprising at least one treatment selected from the group consisting of a presize, a backsize, a subsize, and a saturant.

In a ninth embodiment, the present disclosure provides a coated abrasive article according to any one of the first to eighth embodiments, wherein the abrasive layer further comprises a supersize.

In a tenth embodiment, the present disclosure provides a coated abrasive article according to any one of the first to ninth embodiments, wherein the abrasive layer comprises a make layer comprising a first binder resin, wherein the abrasive particles are embedded in the make layer, and a size layer comprising a second binder resin secured to the make layer and the abrasive particles.

In an eleventh embodiment, the present disclosure provides a coated abrasive article according to the tenth embodiment, wherein the make layer comprises a photoacid cured epoxy resin.

In a twelfth embodiment, the present disclosure provides a coated abrasive article according to any one of the first to ninth embodiments, wherein the abrasive particles are dispersed in a binder resin.

In a thirteenth embodiment, the present disclosure provides a coated abrasive article according to the twelfth embodiment, wherein the abrasive layer comprises shaped abrasive composites.

In a fourteenth embodiment, the present disclosure provides a treated backing comprising: a backing comprising polyester, wherein the backing has a tie layer directly bound thereto, and wherein the tie layer comprises an at least partially cured blend of, on a solids basis, from 50 to 99 parts by weight of at least one styrene-butadiene copolymer latex and from 1 to 50 parts by weight of at least one resorcinol-formaldehyde resin.

In a fifteenth embodiment, the present disclosure provides a treated backing according to the fourteenth embodiment, wherein the tie layer comprises an at least partially cured blend of, on a solids basis, from 85 to 95 parts by weight of the at least one styrene-butadiene copolymer latex and from 5 to 15 parts by weight of the at least one resorcinol-formaldehyde resin.

In a sixteenth embodiment, the present disclosure provides a treated backing according to the fourteenth or fifteenth embodiment, wherein the styrene-butadiene copolymer comprises a carboxylated styrene-butadiene copolymer.

In a seventeenth embodiment, the present disclosure provides a treated backing according to any one of the fourteenth to sixteenth embodiments, wherein the at least one styrene-butadiene copolymer has a glass transition temperature of less than 10° C.

In an eighteenth embodiment, the present disclosure provides a treated backing according to any one of the fourteenth to seventeenth embodiments, wherein the tie layer further comprises at least one of an anionic or nonionic surfactant.

In a nineteenth embodiment, the present disclosure provides a treated backing according to any one of the fourteenth to eighteenth embodiments, wherein the polyester backing comprises a polyester fabric.

In a twentieth embodiment, the present disclosure provides a treated backing according to any one of the fourteenth to eighteenth embodiments, wherein the polyester backing comprises a polyester film.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials used in the Examples are described in Table 1, below.

TABLE 1

| | |
|---|---|
| ACR1 | trimethylolpropane triacrylate, available as SR 351 from Sartomer, Exton, Pennsylvania |
| CLT1 | J-weight polyester cloth with 150 denier flat filament polyester warp & fill, 70 ends/inch × 40 picks/inch (28 ends/cm × 16 picks/cm), 2.2 ounces/square yard (74.6 g/square meter), 68.0 inches (172.7 cm), available as Milliken Style 170313 from Milliken, Spartanburg, Georgia |
| EPR1 | epoxy resin available as Celloxide 2021P from Daicel, Tokyo, Japan |
| FIL1 | calcium metasilicate commercially available as 400 WOLLASTOCOAT from NYCO Minerals, Willsboro, New York |
| FIL2 | nepheline syenite commercially available as Minex 10 from Sibelco, Charlotte, North Carolina |
| FM1 | 3 mil (76.2 micrometers) thickness thermally extruded, biaxially stretched polyethylene terephthalate (PET) film obtained from 3M Company |
| FM2 | 3 mil (76.2 micrometers) thickness PET film with 20 micrometer ethylene acrylic acid primer obtained from 3M Company, St. Paul, Minnesota, made from thermally extruded, biaxially stretched, polyethylene terephthalate (PET) resin |
| FM3 | 3 mil (76.2 micrometers) thickness PET film with urethane available as SK01primer available from Mitsubishi Polyester Film, Greer, South Carolina |
| FM4 | 3 mil (76.2 micrometers) thickness PET film obtained from 3M Company made from thermally extruded, biaxially stretched, polyethylene terephthalate (PET) resin with a primer coating solution was prepared with a 3-component composition including latex resin LAT1, polyfunctional aziridine (obtained as PZ-28 from PolyAziridine LLC, Morgantown, New Jersey) and surfactant SF1 at 10:0.5:0.03 wet weight ratio |
| HMA | polyamide hot melt adhesive available as Jet Melt Brand Adhesive PG3779 from 3M Company |
| INT1 | mixture of triarylsulfonium hexafluoroantimonate salts in propylene carbonate photocatalyst available as CPI 6976 from Aceto, New York, New York |
| INT2 | bis(2,4,6-trimethylbenzoyl)-phenylphosphine oxide photoinitiator available as OMNIRAD 819 photoinitiator from IGM Resins USA Inc., Charlotte, North Carolina |
| LAT1 | Styrene-butadiene latex available as ROVENE 5900 from Mallard Creek Polymers, Charlotte, North Carolina |
| PFR1 | Phenol-formaldehyde resin having a phenol to formaldehyde molar ratio of 1:1.5-2.1, and catalyzed with 2.5 percent by weight potassium hydroxide. |
| RF1 | Resorcinol-formaldehyde resin available as PENACOLITE RESIN R-50 from Sumitomo Chemical Advanced Technologies, Phoenix, Arizona |
| SF1 | Anionic surfactant available as GEMTEX SC-85P from Innospec Active Chemical, North Carolina |
| SF2 | Acidic polyester surfactant commercially available as BYK W985 from BYK-Chemie GmbH, Wesel, Germany |

Adhesives and Resins Preparation

Adhesion promoting layers, make resins and size resins were prepared using standard laboratory mixing equipment. The various compositions are listed below:

Primer 1 (PR1)

Primer 1 (PR1) coating solution was prepared with a two-component composition including LAT1 and RF1 at a 10:1 ratio.

Primer 2 (PR2)

Primer 2 (PR2) coating solution was prepared with a three-component composition including LAT1, RF1 and SF1 at a 10:1:0.05 wet ratio.

Primer 3 (PR3)

Primer 3 (PR3) coating solution was prepared with a three-component composition including LAT1, RF1 and SF1 at a 10:2:0.05 wet ratio.

Make Resin 1 (MR1)

Make Resin 1(MR1) was prepared by adding EPR1(387.3 grams), ACR1(166.2 grams), SF2(6 grams), FIL2(400 grams), INT1(30 grams) and INT2(10 grams) to a 3-liter container. The resin was stirred with an overhead mixer for 15 minutes prior to using.

Make Resin 2(MR2)

Make Resin 2 (MR2) was prepared according U.S. Pat. No. 5,766,277, page 24, Example A lines 13 through 29.

Make Resin 3 (MR3)

Make Resin 3 (MR3) was prepared by adding PFR1 (544 grams), FIL1 (442 grams) and 14 grams of water to a 3-liter container. The resin was stirred with an overhead mixer for 15 minutes prior to using.

Make Resin 4 (MR4)

Make Resin 4 (MR4) was prepared by a three-component composition including PFR1 (89.7 parts), water (10 parts) and SF1 (0.3 parts).

Make Resin 5 (MR5)

Make Resin 5 (MR5) was prepared by a three-component composition including PFR1 (89.6 parts), water (10 parts) and SF1 (0.5 parts).

Make Resin 6 (MR6)

Make Resin 6 (MR6) was prepared by a four-component composition including PFR1 (81.4 parts), water (9 parts), SF1 (0.5 parts) and LAT1 (9.0 parts).

Size Resin 1 (SR1)

Size Resin 1 (SR1) was prepare by adding EP1 (97 grams) and INT1 (3 grams) into a 250-ml container. The resin was stirred with overhead stirrer for 15 minutes prior to using.

Size Resin 2 (SR2)

Size Resin 2 (SR2) was prepared by a three-component composition including PFR1 (89.7 parts), water (10 parts) and SF1 (0.3 parts).

Size Resin 3 (SR3)

Size Resin 3 (SR3) was prepared by a three-component composition including PFR1 (89.6 parts), water (10 parts) and SF1 (0.5 parts).

Size Resin 4 (SR4)

Size Resin 4 (SR4) was prepared by a four-component composition including PFR1 (81.4 parts), water (9 parts), SF1 (0.5 parts) and LAT1 (9.0 parts).

Backing Example 1 (BE1)

Backing Example 1 (BE1) was prepared by coating PR1 onto a 25.4 cm×30.5 cm sample of FM1 using a #22 Mayer rod. BE1 was then cured at 100° C. for 5 minutes.

Backing Example 2 (BE2)

Backing Example 2 (BE2) was prepared by coating PR1 onto 30.5 cm wide sample of CLT1 using a 25.4 cm wide coating knife set at 50.8 micrometers. BE2 was then cured at 100° C. for 5 minutes Preparation of Treated Polyester Film Backing Examples BE-3A to BE-7F Samples of FM1 was treated with primer coating PR2 or PR3 using a GARDCO Automatic Drawdown Machine II from Paul N. Gardner Company, Inc., Pompano Beach, Florida. A 0.3 J/cm$^2$ corona treatment was applied to each sample. For each sample, primer of four thicknesses were coated with different Mayer wire-wound coating rods from RD Specialties, Webster, New York. The treated film samples were then dried and cured in a conveyor belt oven at 266° F. (136° C.) at a line speed of 12 feet/min (3.7 m/min). The total drying and curing time was 1 minute.

TABLE 2

| EXAMPLE | PRIMER TYPE | ROD NO. | NOMINAL WET FILM THICKNESS, microns |
|---|---|---|---|
| BE-3A | PR2 | 10 | 20.57 |
| BE-3B | PR2 | 10 | 20.57 |
| BE-3C | PR2 | 10 | 20.57 |
| BE-4A | PR2 | 20 | 45.72 |
| BE-4B | PR2 | 20 | 45.72 |
| BE-4C | PR2 | 20 | 45.72 |
| BE-5A | PR2 | 30 | 68.58 |
| BE-5B | PR2 | 30 | 68.58 |
| BE-5C | PR2 | 30 | 68.58 |
| BE-6A | PR2 | 40 | 91.44 |
| BE-6B | PR2 | 40 | 91.44 |
| BE-6C | PR2 | 40 | 91.44 |
| BE-6D | PR2 | 40 | 91.44 |
| BE-7A | PR3 | 30 | 68.58 |
| BE-7B | PR3 | 30 | 68.58 |
| BE-7C | PR3 | 30 | 68.58 |
| BE-7D | PR3 | 30 | 68.58 |
| BE-7E | PR3 | 30 | 68.58 |
| BE-7F | PR3 | 30 | 68.58 |

Preparation of Coated Abrasives Examples using MR1

Coated abrasive constructions using backings BE1, FM2, FM3 and FM4 were prepared by coating MR1 onto a 10 in×5 in (25.4 cm×12.7 cm) sample of BE1 or FM2 or FM3 or FM4 using a 101.6 cm coating knife (available from: Paul N. Gardner Company, Inc.) set at a 3-mil (76 micron) gap. Next, about P150 F #X aluminum oxide was drop coated onto the hot make resin resulting in a mineral weight of about 110 gsm. The sample was then irradiated with UV D-bulb (600 watts/in$^2$, (9.3 W/cm$^2$)) at 15 fpm (4.6 m/min). The sample was then cured in an oven at 140° C. for 10 minutes. Example constructions are reported in Table 3.

Preparation of Coated Abrasives Examples using MR2

Coated abrasive constructions using backing BE1 and FM2 were prepared by coating MR2 onto a 10 in×5 in (25.4 cm×12.7 cm) sample of BE1 or FM2 using a 101.6 cm coating knife (available from: Paul N. Gardner Company, Inc.) set at a 3-mil (76 micron) gap. The MR1 resin and coating knife were heated to 100° C. for 30 minutes prior to coating. Next, about P150 F #X aluminum oxide was drop coated onto the hot make resin resulting in a mineral weight of about 110 grams per square meter (gsm). The sample was then irradiated with UV D-bulb (600 watts/in$^2$ (9.3 W/cm$^2$)) at 15 feet per minute (4.6 m/min). The sample was then cured in an oven at 120° C. for 10 minutes. The make/mineral sample was then cooled to room temperature and sized with SR1 using a 3 inches (7.6 cm) wide paint brush. The size weight was about 70 gsm. The sized sample was then irradiated with UV D bulb (600 watts/in$^2$ (9.3 W/cm$^2$)) at 15 fpm (4.6 m/min). The sized sample was then cured in an oven at 120° C. for 10 minutes. Example constructions are reported in Table 3, below.

TABLE 3

| EXAMPLE | BACKING TYPE | MAKE RESIN TYPE | SIZE RESIN TYPE |
|---|---|---|---|
| CA1 | BE1 | MR1 | NA |
| CA2 | BE1 | MR2 | SR1 |
| Comparative Example 1 | FM2 | MR2 | SR1 |
| Comparative Example 2 | FM2 | MR1 | NA |
| Comparative Example 3 | FM3 | MR1 | NA |
| Comparative Example 4 | FM4 | MR1 | NA |

Preparation of Coated Abrasives Examples using MR3

Coated abrasive construction using backing CLT1 and BE2 were prepared by coating MR3 onto a 12 in×6 in (30.5×15.2) sample of CLT1 or BE2 backing using a 100.6 cm coating knife (available from: Paul N. Gardner Company, Inc.) set at a 2-mil (51-micron) gap. Next, P120 F #X aluminum oxide was drop coated onto make resin resulting in a mineral weight of about 140 gsm. The sample was cured in an oven at 90° C. for 90 minutes and at 102° C. for 12 hours. Some examples were corona treated at 0.3 J/cm$^2$ prior to coating of MR3; see coated abrasive examples in Table 4, below.

TABLE 4

| COATED ABRASIVE EXAMPLES | REPLICATE | BACKING TYPE | MAKE RESIN TYPE | CORONA TREATED |
|---|---|---|---|---|
| CA3 | A | BE2 | MR2 | No |
| | B | BE2 | MR2 | No |
| | C | BE2 | MR2 | No |
| | D | BE2 | MR2 | No |

TABLE 4-continued

| COATED ABRASIVE EXAMPLES | REPLICATE | BACKING TYPE | MAKE RESIN TYPE | CORONA TREATED |
|---|---|---|---|---|
| CA4 | A | BE2 | MR2 | Yes |
|  | B | BE2 | MR2 | Yes |
|  | C | BE2 | MR2 | Yes |
|  | D | BE2 | MR2 | Yes |
| Comparative Example 5 | A | CLT1 | MR2 | No |
|  | B | CLT1 | MR2 | No |
|  | C | CLT1 | MR2 | No |
|  | D | CLT1 | MR2 | No |

Preparation of Coated Abrasive Examples using MR4, MR5, MR6

Make resin (MR4, MR5, MR6) was applied on to backing (BE3-BE7 or FM1) using a GARDCO Automatic Drawdown Machine II with an automatic Mayer rod #4 (9.14 microns nominal wet thickness) from RD Specialties, Webster, New York. After applying the make resin, abrasive mineral P240 BFRPL aluminum oxide was then evenly sprinkled onto the make resin by hand. The sheets were processed through a conveyor belt oven at 300° F. (149° C.) at a line speed of 1.8 m/min. The total drying and curing time was 4 minutes. The size resin was then coated onto the make layer and abrasive particles using paint roller. The resultant article was then processed through the conveyor belt oven again at 300° F. (149° C.) at a line speed of 6 feet/min (1.8 m/min). The total drying and curing time was 10 minutes. After curing was complete, the coated abrasive material was converted into 2.54 cm×15.24 cm strips for testing. Coated abrasive examples are reported in Table 5, below.

TABLE 5

| EXAMPLE | REPLICATE | BACKING TYPE | MAKE RESIN TYPE | SIZE RESIN TYPE |
|---|---|---|---|---|
| CA5 | A | BE3-A | MR4 | SR2 |
|  | B | BE3-B | MR4 | SR2 |
|  | C | BE3-C | MR4 | SR2 |
| CA6 | A | BE4-A | MR4 | SR2 |
|  | B | BE4-B | MR4 | SR2 |
|  | C | BE4-C | MR4 | SR2 |
| CA7 | A | BE5-A | MR4 | SR2 |
|  | B | BE5-B | MR4 | SR2 |
|  | C | BE5-C | MR4 | SR2 |
| CA8 | A | BE6-A | MR4 | SR2 |
|  | B | BE6-B | MR4 | SR2 |
|  | C | BE6-C | MR4 | SR2 |
|  | D | BE6-D | MR4 | SR2 |
| CA9 | A | BE7-A | MR5 | SR3 |
|  | B | BE7-B | MR5 | SR3 |
|  | C | BE7-C | MR5 | SR3 |
|  | D | BE7-D | MR6 | SR4 |
|  | E | BE7-E | MR6 | SR4 |
|  | F | BE7-F | MR6 | SR4 |
| Comparative Example 6 | A | FM1 | MR4 | SR2 |
|  | B | FM1 | MR4 | SR2 |
|  | C | FM1 | MR4 | SR2 |

Coated Abrasive Performance Testing
Hand Shelling Test

Manual abrasive adhesion testing was performed by a sequential bending and hard pressing protocol with 2.54 cm×15.24 cm. For testing purposes, the coated abrasive strips were first bent at 180 degrees with the coating layer pointing outwards and then the folding line was pressed hard manually; repeated this bending and pressing process continuously in machine direction so that the coating on the film sample testing area was exposed to this bending and hard pressing. A visual rating of 1, 3, or 5 was given to each sample based on the amount of shelling observed. If the coating didn't come off, then it was called no shelling, meaning good adhesion, and given an acceptable visual rating of 1. Otherwise, it was called shelling, meaning poor adhesion, and given a visual rating of 3 (failure/light shelling observed) or 5 (failure/heavy shelling observed).

Results of the Hand Shelling Test are reported in Table 6, below.

TABLE 6

| EXAMPLE | REPLICATE | HAND SHELL TEST RESULTS, rating |
|---|---|---|
| CA1 |  | 1 |
| CA2 |  | 1 |
| Comparative Example 1 |  | 1 |
| Comparative Example 2 |  | 1 |
| Comparative Example 3 |  | 5 |
| Comparative Example 4 |  | 5 |
| CA5 | A | 5 |
|  | B | 4.5 |
|  | C | 5 |
| CA6 | A | 2.5 |
|  | B | 5 |
|  | C | 5 |
| CA7 | A | 4.5 |
|  | B | 2.5 |
|  | C | 4.0 |
| CA8 | A | 2.5 |
|  | B | 3.0 |
|  | C | 3.0 |
|  | D | 3.0 |
| CA9 | A | 3.0 |
|  | B | 1.0 |
|  | C | 1.0 |
|  | D | 1.0 |
|  | E | 1.0 |
|  | F | 1.0 |
| Comparative Example 6 | A | 4.5 |
|  | B | 5.0 |
|  | C | 5.0 |

Peel Adhesion Test

Coated Abrasive examples CA3-C4 and Comparative F were converted into 8 cm wide by 25 cm long test specimens. One-half the length of a wooden board (17.8 cm by 7.6 cm by 0.6 cm) is coated with HMA applied with a hot melt glue gun. The entire width of, but only the first 15 cm of the length of, the coated abrasive article was coated with laminating adhesive on the side bearing the abrasive particles. The side of the coated abrasive article bearing the abrasive particles was attached to the side of the board containing the laminating adhesive coating in such a manner that the 10 cm of the coated abrasive article not bearing the laminating adhesive overhangs from the board. Pressure was applied such that the board and the coated abrasive article become intimately bonded. Operating at 25° C., the abrasive article to be tested is cut along a straight line on both sides of the article such that the width of the coated abrasive article is reduced to 5.1 cm. The resulting abrasive article/board composite is mounted horizontally in a fixture attached to the upper jaw of a tensile testing machine available as SINTECH 6W from MTS Systems Corp., Eden Prairie, Minnesota. Approximately 1 cm of the overhanging portion of the coated abrasive article was mounted into the lower jaw of the machine such that the distance between the jaws was 12.7 cm. The machine separated the jaws at a rate of 0.05 centimeter/second (cm/sec), with the coated abrasive article being pulled at an angle of 90° away from the wooden board so that a portion of the coated abrasive article separated from the board. The force required for such separation (i.e., stripback force) is reported in Newton/meter (N/m). Results are reported in Table 7, below.

TABLE 7

| EXAMPLE | REPLICATE | STRIPBACK FORCE, N/m |
|---|---|---|
| CA3 | 1 | 1.2 |
| | 2 | 1.15 |
| | 3 | 1.20 |
| | 4 | 1.11 |
| CA4 | 1 | 1.21 |
| | 2 | 1.21 |
| | 3 | 1.24 |
| | 4 | 1.26 |
| Comparative Example 6 | 1 | 0.94 |
| | 2 | 0.81 |
| | 3 | 0.82 |
| | 4 | 0.81 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A coated abrasive article comprising:
   a backing comprising polyester and having a first major surface and a second major surface and a thickness of at least 0.02 mm and less than 5 mm;
   a tie layer directly bound to at least a portion of the first major surface, wherein the tie layer comprises an at least partially cured blend of, on a solids basis,
      from 50 to 99 parts by weight of at least one styrene-butadiene copolymer latex wherein the styrene-butadiene copolymer comprises carboxylated styrene-butadiene copolymer;
      from 1 to 50 parts by weight of a tie layer resin, the tie-layer resin comprising a Novolac resorcinol-formaldehyde resin,
      and wherein the tie layer is acidic; and
   an abrasive layer directly bound to at least a portion of the tie layer, the abrasive layer comprising abrasive particles and a make resin in contact with the tie layer, wherein the make resin comprises a different composition from the tie layer resin, and wherein the make resin comprises a phenolic resin.

2. A coated abrasive article according to claim 1, wherein the tie layer comprises an at least partially cured blend of, on a solids basis, from 85 to 95 parts by weight of the at least one styrene-butadiene copolymer latex and from 5 to 15 parts by weight of the at least one resorcinol-formaldehyde resin.

3. A coated abrasive article according to claim 1, wherein the at least one styrene-butadiene copolymer has a glass transition temperature of less than 10° C.

4. A coated abrasive article according to claim 1, wherein the tie layer further comprises at least one of an anionic or nonionic surfactant.

5. A coated abrasive article according to claim 1, wherein the backing comprises a woven polyester fabric.

6. A coated abrasive article according to claim 1, wherein the backing comprises an extruded polyester film.

7. A coated abrasive article according to claim 1, wherein the backing comprises a treated backing comprising at least one treatment selected from the group consisting of a presize, a backsize, a subsize, and a saturant.

8. A coated abrasive article according to claim 1, wherein the abrasive layer further comprises a supersize.

9. A coated abrasive article according to claim 1, wherein the abrasive layer comprises a make layer comprising the make resin, and a size layer comprising a size resin secured to the make layer and the abrasive particles.

10. A coated abrasive article according to claim 1, wherein the abrasive layer comprises shaped abrasive composites.

11. A coated abrasive article according to claim 1, wherein the phenolic resin is a phenol formaldehyde resin having a phenol to formaldehyde molar ratio of 1:1.5-2.1.

12. A coated abrasive article according to claim 1, wherein the tie-layer resin further comprises a free-radically polymerizable monomer and/or oligomer, a melamine-formaldehyde resin, an aminoplast resin, a cyanate resin or combinations thereof.

13. A coated abrasive article according to claim 12, wherein the free-radically polymerizable monomer and/or oligomer comprises: methyl methacrylate, ethyl methacrylate, styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, or pentaerythritol tetraacrylate.

14. A coated abrasive article comprising:
   a backing comprising polyester and having a first major surface and a second major surface and a thickness of at least 0.02 mm and less than 5 mm;
   a tie layer directly bound to at least a portion of the first major surface, wherein the tie layer comprises an at least partially cured blend of, on a solids basis;
      from 50 to 99 parts by weight of at least one styrene-butadiene copolymer latex, wherein the sytrene-butadiene copolymer comprises a carboxylate sytrene-butadiene copolymer; and
      from 1 to 50 parts by weight of at a first resin, the first resin comprising a Novolac resorcinol-formaldehyde resin, and
      wherein the tie layer is acidic; and
   an abrasive layer directly bound to at least a portion of the tie layer, the abrasive layer comprising abrasive particles and a second resin in contact with the tie layer, wherein the second resin comprises a different composition from the first resin, and wherein the second resin comprises a cationically cured resin.

* * * * *